United States Patent [19]

Mondragon Sorribes

[11] 4,242,835

[45] Jan. 6, 1981

[54] CONTAINER FOR THE INDIVIDUAL TRANSPORTATION OF PLANTS

[76] Inventor: Ramón Mondragon Sorribes, Reverendo Marti 11 & 13, Meliana, Valencia, Spain

[21] Appl. No.: 19,186

[22] Filed: Mar. 9, 1979

[30] Foreign Application Priority Data

Mar. 10, 1978 [ES] Spain ................................. 234.563
Feb. 19, 1979 [ES] Spain ................................. 241.472

[51] Int. Cl.³ ..................... A01G 9/02; A01G 27/00
[52] U.S. Cl. ...................................... 47/84; 47/69; 47/79
[58] Field of Search ................. 47/84, 79, 80, 69, 71

[56] References Cited

U.S. PATENT DOCUMENTS

| | | | |
|---|---|---|---|
| 2,288,678 | 7/1942 | Blumentritt | 47/79 |
| 3,241,706 | 3/1966 | Monaco et al. | 47/69 X |
| 3,314,194 | 4/1967 | Halleck | 47/84 X |
| 3,748,781 | 7/1973 | Erling | 47/84 |
| 3,848,358 | 11/1974 | Messmer | 47/69 |
| 3,991,516 | 11/1976 | Cicero | 47/71 |
| 4,075,786 | 2/1978 | Zyl | 47/84 |

FOREIGN PATENT DOCUMENTS

1446275  6/1966  France .......................................  47/79

Primary Examiner—Steven A. Bratlie
Attorney, Agent, or Firm—Wenderoth, Lind & Ponack

[57] ABSTRACT

A container unit for the growth and transportation of plants includes a container having an open upper end having formed in the interior thereof a recess defining an annular step including a horizontal surface and a vertical surface. A soil receptacle contains soil having therein a plant, and the receptacle has an open upper end having extending upwardly therefrom an integral flange. The receptacle is positioned within the container with the flange of the receptacle being supported by and soldered to the horizontal surface of the container, to thereby form a sealed water receiving chamber between the exterior of the receptacle and the interior of the container. A disc retains the soil within the receptacle and has a central hole dimensioned to have extend therethrough the stem of the plant. The disc has a slit to allow the stem of the plant to be inserted into the central hole. The disc is positioned over and supported by the annular flange of the receptacle. A transparent cover includes a lower edge precisely fitting within the vertical surface of the recess of the container to securely retain the cover to the container and to press the disc against the annular flange of the receptacle, to thereby maintain the disc in a position to retain soil within the receptacle.

3 Claims, 4 Drawing Figures

CONTAINER FOR THE INDIVIDUAL TRANSPORTATION OF PLANTS

BACKGROUND AND SUMMARY OF THE INVENTION

Considered as a sign of thoughtfulness and courtesy is the gift of cut flowers, given on those occasions when flowers are thought of as being especially appropriate, and even on other occasions, given the quality and beauty of such gift.

Nevertheless, such gift has the disadvantage of impermanence, since on one day a flower is delicate and beautiful, but within 24 hours, the fragrance and beauty of the flower is transformed very rapidly into wilted, bad smelling and spoiled remains. The impression of such wilted flower, having lost its original luxuriance, is thus reduced.

Such circumstances tend to result in the conversion of a gift of cut flowers into a gift of a live plant.

A live plant also possesses its own important beauty, since there exist many flowering species which last for weeks, even months, with just a minimum of attention. In accordance with the planter of the present invention, even the daily bother of watering the plant is eliminated.

This gift of a live plant, then, prolongs the visible evidence of the sentiments which motivated the gift in the first place. A live plant is a much longer lasting remembrance than the simple nicety of a cut flower which lasts only a day.

Plants, due to the characteristic of having to be rooted in soil and remaining therein, require the necessity of a container during transportation that not only guarantees their physical support and safeguarding against lack of water, disruption of soil, and damage from days spent being handled during the course of transportation, but that also guarantees that the appearance of the container will be sufficiently attractive, functional and efficient to continue, upon delivery of the plant to its destination, being an attractive planter containing a live plant that will remain healthy throughout its normal life span, dependent upon the care given by the recipient.

For better comprehension of the following detailed description of one embodiment of the container of the invention, reference is made to the enclosed drawings which are exemplary only and not limiting to the scope of the invention.

DETAILED DESCRIPTION OF THE INVENTION

Figure 1:
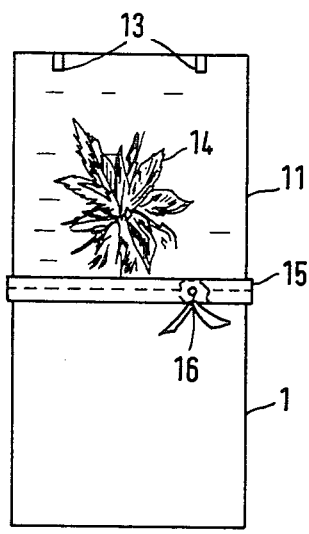
FIG. 1 is an elevation view of a container with a plant, as it will appear during service and as it will be available for sale.
Figure 2:
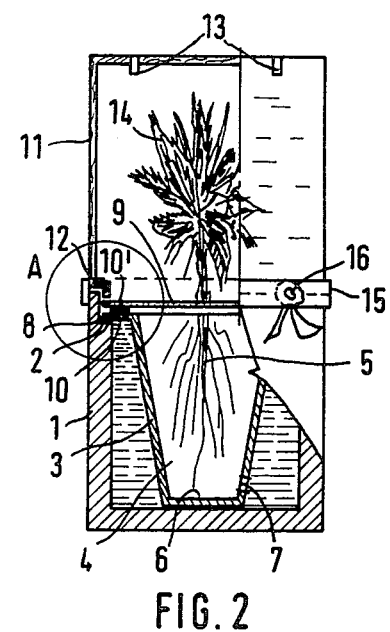
FIG. 2 is a view similar to FIG. 1, but with one vertical half being shown in section.

Referring to the drawings, there is shown a planter or container 1, the exterior of which is suitably proportioned and which is generally made of a material of a thermo-solderable nature.

The planter has an interior annular rim or step 2 (slightly lower than the mouth of the planter), on top of which will rest an annular flange or brim 8 of another container 3 which is a soil receptacle. This receptacle 3 has a conical or similar form, and receives soil 4 within which a plant is planted, the roots of the plant being indicated at 5.

Adjacent the bottom 6 of the soil receptacle 3, there is a small orifice 7 that allows passage of water that is introduced into the interior of the planter 1 (surrounding the exterior of the soil receptacle 3).

This water is introduced into the interior of the planter 1 through an orifice 10 (normally closed by a sealing stopper 10'), and establishes an automatic capillary irrigation of the plant.

The flange 8 of the soil receptacel 3 and the interior rim 2 of the planter 1 will be soldered, thus forming a single solid piece, given the nature of the material used for the containers. Thus, the liquid introduced through the orifice 10 cannot escape by any means when orifice 10 is sealed, thereby forming a clean and hermetically sealed water container.

Figure 4:
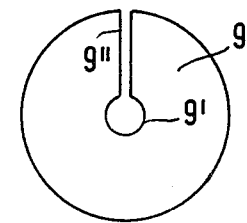

This cleanliness applies also to the dirt 4 contained in the soil receptacle 3, due to a soil containing disc 9 which has a central hole 9' through which the stem of the plant will easily pass. Disc 9 also has a radial slit 9" leading to the central hole 9'. The proportions of the central orifice 9' and the radial slit 9" have been slightly exaggerated in FIG. 4.

The soil containing or retaining disc 9 can be made of polyurethane, which is a humidity isolator, and the disc 9 exactly fits within the circumference of the planter 1 within the rim or step 2 and rests directly over the brim 8 of the soil receptacle 3.

Figure 3:
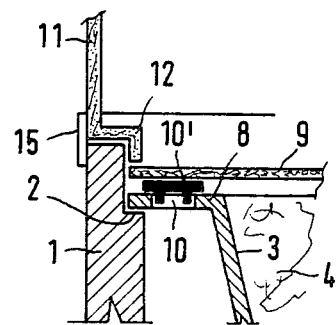
FIG. 3 is an enlarged section view of the encircled part marked "A" in FIG. 2; and, FIG. 4 is a plan view of a soil retaining disc employed in the container.

The completed unit includes a transparent cover 11 having a bottom edge with a double step 12 allowing it to fit precisely into the top edge of the step 2 of the planter 1, as illustrated in FIG. 3. While remaining securely fitting into the top of the planter, the lower edge 12 of the transparent cover simultaneously exerts pressure against the soil retaining disc 9 in such a way as to maintain the soil in the soil receptacle 3 and to insure maintenance of the position of the roots and stem of the plant during the entire duration of transport of the unit.

The fitted placement of the transparent cover 11 over the planter 1, which guarantees the protection of the leafy part 14 of the plant, can be obtained by any known and suitable means, the simple pressure closure mentioned above, or possibly a screw or bayonette type closure of the cover over the planter, or placement of brackets on the planter which interlock with corresponding pieces on the cover, or any other means that would assure a perfect, fitted closure of the transparent cover 11 over the planter 1, which, in turn, guarantees the protection of the plant inside the planter.

As a decorative detail, an adhesive ribbon 15 may be securely attached to surround the line of juncture between the planter and the cover. Ribbon 15 may form a seal to guarantee protection of the plant.

Before placing the transparent cover over the planter, there will have been introduced into the planter a certain amount of water through the orifice 10, which will then be tightly plugged by plug 10'. The cover 11 will then be securely locked into place over the planter 1 by whatever device is used, and finally, the decorative ribbon and seal 15 will be put into place.

The planter and cover of a particular unit must conform to each other, but may be of any desired configuration, such as cylindrical, eliptical, or any other artistic form.

The colors of the material from which the containers are fabricated may also vary.

The nature, class, size and variety of the plants may be as is suitable and desired.

I claim:

1. A container unit for the growth and transportation of plants, said unit comprising:

a container having a closed lower end and an open upper end, said container upper end having formed in the interior thereof a recess defining an annular step including an annular substantially horizontal surface and an inner substantially vertical surface;

a soil receptacle containing soil having therein a plant, said receptacle having a closed lower end and an open upper end, said receptacle upper end having extending radially outwardly therefrom an integral annular flange;

said receptacle being positioned within said container in a substantially coaxial manner with said annular flange of said receptacle being supported by said annular horizontal surface of said container, and said annular flange being soldered to said annular horizontal surface to form a hermetically sealed chamber defined by the outer surface of said receptacle and the inner surface of said container;

said annular flange having extending therethrough an orifice for the introduction of water into said chamber;

plug means for closing said water introduction orifice to prevent the leakage of water from said chamber;

said receptacle having therein, adjacent said lower end thereof, small orifice means for allowing water to pass from said chamber to said soil in said receptacle to achieve automatic capillary irrigation of said plant in said soil;

disc means for retaining said soil within said receptacle, said disc means having therein a central hole dimensioned to have extend therethrough the stem of said plant, said disc means having therein slit means extending from the periphery of said disc means to said central hole for enabling said stem of said plant to be inserted into said central hole, said disc means being positioned over and supported by said annular flange of said receptacle, and said disc means having an outer edge precisely fitting within said vertical surface of said recess of said container; and a transparent cover including an open lower end having edge means precisely fitting within said vertical surface of said recess of said container for securely retaining said cover to said container and for pressing said disc means against said annular flange of said receptacle to thereby maintain said disc means in an operative position to retain said soil within said receptacle.

2. A unit as claimed in claim 1, wherein said edge means of said lower end of said cover includes an annular, generally horizontal portion extending inwardly from the wall of said cover and an annular, generally vertical portion extending downwardly from said horizontal portion and abutting said disc means.

3. A unit as claimed in claim 1, further comprising a decorative adhesive ribbon securely attached to the exteriors of said cover and said container and covering and sealing the horizontal juncture therebetween.

* * * * *